United States Patent Office 2,955,144
Patented Oct. 4, 1960

2,955,144

PROCESS FOR REFINING NAPHTHALENE

William E. Sisco, Bound Brook, and Popkin Shenian and Melvin I. Moyer, Plainfield, N.J., assignors to American Cyanamid Company, New York, N.Y., a corporation of Maine No Drawing. Filed June 18, 1958, Ser. No. 742,744

7 Claims. (Cl. 260—674)

This invention relates to an improved process for purifying naphthalene.

The purification of crude naphthalene for many chemical purposes, such as the preparation of intermediates for dyestuffs, presents a considerable economic problem. In general, crude naphthalene of from 75° C. to slightly over 78° C. setting point has to be transformed into purified naphthalene having a setting point in excess of 79.5° C. In the past, refining of naphthalene has been effected by a combination of sulfuric acid wash and fractional distillation, customarily with a neutralization of excess acidity before distilling. The sulfuric acid reacts with many of the impurities, such as thianaphthene, sulfonating them or polymerizing them so that they are either soluble in the dilute aqueous alkali neutralization wash or have their boiling points so greatly changed as to make removal by fractional distillation simple. The conventional process outlined above is capable of producing a high grade of refined naphthalene. However, it has two very serious disadvantages. The first is a relatively high cost because a large amount of sulfuric acid is used with increased neutralization costs. What is more important in some cases, a considerable amount of naphthalene is sulfonated and hence lost as its recovery from water and alkali washings is normally not considered economical. The second disadvantage is the production of an undesirable effluent containing relatively large amounts of organic material. In many parts of the country, this presents a very serious problem of stream pollution and can only be solved at relatively large cost by special effluent treatments. Another disadvantage is that with many crude naphthalenes, the resulting product does not have as good an "acid wash color" as is desired.

It has been proposed to mix para-formaldehyde with concentrated sulfuric acid and wash the crude naphthalene with this mixture. This is shown for example in British Patent No. 760,054. While it is possible to obtain high grade product, this requires a time cycle of five to eighteen hours which is prohibitive for practical commercial operation.

The present invention refines crude naphthalene by treating it with aqueous formaldehyde using as a catalyst not sulfuric acid, but a sulfonic acid. The nature of the sulfonic acid is not particularly critical. It can be any aromatic sulfonic acid, such as benzene sulfonic acid, alpha or beta-naphthalene sulfonic acid or it may be an alkane sulfonic acid, such as ethane sulfonic acid. However, a sulfonic acid must be used, and when used, purifications can be effected in extremely short time, normally from one to twenty minutes and in no case over an hour. Just why the sulfonic acid works so quickly whereas sulfuric acid will not has not been definitely established and no theory is advanced.

The amount of sulfonic acid used is not too critical, varying from 1% to 10% of the crude naphthalene; preferably from 3% to 4% is used although useful results may be obtained throughout the range. The limits of formaldehyde are only reasonably sharp, varying from 0.5 to 5 parts of a 37% aqueous formaldehyde solution, or its equivalent, i.e., from about 0.185 to about 1.85 parts of formaldehyde as an aqueous solution per 100 parts of crude naphthalene. Again, there is a preferred range of from 1.5% to 2.5%. The temperature also is not extremely critical and elevated temperatures from 80° C. to 120° C. may be used. Preferably, the range from 80° C. to 100° C. is employed, although higher temperatures up to 120° C. may be used but require pressure. As pointed out above, the time may be from one minute to an hour, but for practical purposes in equipment provided with good agitation, ten to twenty minutes is satisfactory.

It is not necessary that the sulfonic acid which is used as a catalyst be pure or that only a single sulfonic acid be present. The sulfonic acid, however, should be soluble in the naphthalene. For example, the present process may be combined with a short sulfuric acid wash and in such a case, the sulfonic acids formed in the wash may be used, even though they may be quite impure. Alternatively, sulfonic acid or acids may be added in the preformed state. Obviously, of course, the sulfonic acid may be introduced in more than one of the above ways in a particular instance. The fact that the mode of introduction of the sulfonic acid is not particularly critical is an advantage of the present invention.

While the process of the present invention is not perfect, that is to say there is some loss of naphthalene, this loss is markedly less than with the ordinary sulfuric acid treatment and at the same time, the savings in reagent cost and naphthalene loss are not off-set by any deterioration in quality. In fact, the product obtained by the process of the present invention has a better color and a better "acid wash color" than conventionally sulfuric acid washed naphthalene from the same crude. It is unusual to find a process which results in marked improvements without any off-setting losses and this constitutes a practical advantage of the present invention. The invention will be described in greater detail in conjunction with the following specific examples which are illustrative only and which, for the most part, include comparative tests with sulfuric acid alone. The parts are by weight unless otherwise specified.

*Example 1*

1000 parts of 78 degree freezing point crude naphthalene was agitated with 50 parts of 93% sulfuric acid at 80–100° C. in two washes. After each wash, the acid layer was separated. After the two washes, the naphthalene contained a small amount of sulfonic acids of naphthalene and its impurities. There was then added 17 parts of 37% aqueous solution of formaldehyde, the mixture thoroughly agitated at 80–100° C. for twenty minutes. At the end of the reaction period, the mixture was allowed to settle forming two layers, the lower of which was withdrawn.

The naphthalene layer was then neutralized by washing with 50 parts of 15% aqueous sodium hydroxide solution and fractionally distilled. Ten parts of a forerun were obtained and 880 parts of a refined fraction. The refined fraction had a freezing point of 79.8° C., was water white in color, and had an AWT number of 7. There remained in the still pot 70 parts of residue of which 30 parts were naphthalene. Since the naphthalene in the forerun and residue is readily recoverable, the loss of naphthalene in irrecoverable form was only 5.4%. The process removed 80% of the impurities present in the crude.

The same crude naphthalene was purified by the conventional sulfuric acid purification with amounts of sulfuric acid set out below and the product had a freezing point of 79.6, an "acid wash color" number of 14 and represented a naphthalene loss of 9.3%.

The above procedures were repeated with a number of different crudes, in one case using only a single wash with sulfuric acid before the formaldehyde treatment. The amount of formaldehyde varied somewhat. The times varied from ten to fifteen minutes. The results appear in the following table:

TABLE I

| Method of Refining | S.P. of Crude, degrees | Wt. Percent of First Acid Wash (as is) | Wt. Percent of Second Acid Wash (as is) | Wt. Percent of 37% Formaldehyde (as is) | Refined Naph. F.P., degrees | Refined Naph. A.W.T.[1] | Real Naph. Loss[2] (percent) |
|---|---|---|---|---|---|---|---|
| Sulfuric Acid | 78.26 | 7.0 | 7.0 | | 79.58 | 14 | 9.3 |
| Formaldehyde | 78.26 | 1.7 | 3.3 | 1.7 | 79.77 | 8 | 5.4 |
| Sulfuric Acid | 78.58 | 7.0 | 7.0 | | 79.50 | 8 | 9.7 |
| Formaldehyde | 78.58 | 4.0 | | 2.5 | 80.00 | 7 | 5.8 |
| Sulfuric Acid | 75.75 | 10.0 | 8.0 | | 79.78 | 9 | 11.1 |
| Formaldehyde | 75.75 | 2.5 | 4.0 | 2.0 | 79.86 | 9 | 6.8 |
| Sulfuric Acid | 77.54 | 10.0 | 6.2 | | 79.59 | 14 | 6.2 |
| Formaldehyde | 77.54 | 2.5 | 4.0 | 2.0 | 79.82 | 9 | 5.2 |

[1] Acid wash color test.
[2] This value represents the fraction of the real naphthalene in the crude which cannot be accounted for in the distillate or residue.

It will be noted from the results shown in the above table that it is possible to exploit the advantages of the present invention in two different ways. Either the same purity of naphthalene can be obtained with less loss or a greater purity can be obtained with the same loss. Of course, a compromise may be chosen in which the purity is somewhat increased with a loss that is less than that obtained without the procedure of the present invention.

*Example 2*

The procedure of Example 1 was repeated but instead of the sulfuric acid wash, 30 parts of alpha-naphthalene sulfonic acid was added with the formaldehyde. A refined product was obtained having a freezing point of 79.6° C.

*Example 3*

The procedure of Example 2 was repeated replacing the alpha-naphthalene sulfonic acid with beta-naphthalene sulfonic acid. The refined naphthalene was of substantially the same grade having a freezing point of 79.8° C.

*Example 4*

The procedure of Example 3 was repeated replacing the beta-naphthalene sulfonic acid with mixed lower alkane sulfonic acids. The refined naphthalene had the same freezing point as in Example 3.

*Example 5*

The procedure of Example 3 was repeated replacing the beta-naphthalene sulfonic acid with the same amount of thianaphthene sulfonic acid. The naphthalene obtained had a freezing point of 79.7° C.

*Example 6*

The sulfonic acid wash step of Example 1 was omitted but in the formaldehyde treatment step, 50 parts of the aqueous layer from the formaldehyde treatment of Example 1 was added. Analysis of this waste formaldehyde wash shows that it contained about 70% of naphthalene and thianaphthene sulfonic acids. The refined naphthalene resulting had a freezing point of 80.0° C.

*Example 7*

1000 parts of a crude naphthalene having a setting point of 78.3° C. and containing 0.36% sulfur was treated by the procedure of Example 1. However, the amount of sulfuric acid used in the two washes was increased to 80 parts and the amount of formaldehyde in the formaldehyde step increased to 30 parts. The refined naphthalene obtained had a freezing point of 80.0° C. and contained 0.01% sulfur.

*Example 8*

1000 parts of 78.0° C. setting point of crude naphthalene was agitated for twenty minutes with 100 parts of 60% sulfuric acid and 20 parts of formaldehyde. The acidic phase was separated, the crude washed with 50 parts of 15% aqueous sodium hydroxide solution and then fractionally distilled. The purified naphthalene had a freezing point of 78.4° C. which shows that the treatment did not effect a signification degree of purification. It is noted that in this example, sulfuric acid was too weak to result in any substantial sulfonations and shows that the presence of the sulfonic acid in the formaldehyde step is essential.

*Example 9*

1200 parts of crude naphthalene (setting point 78.12° C.), 36 parts of para-formaldehyde and 12 parts of concentrated sulfuric acid were agitated at 95–100° C. Four experiments were carried out for different times. The naphthalene was then washed with aqueous alkali and fractionally distilled. The quality of the final products for the different times is shown in the following table:

TABLE 2

| Time: | Setting point of finished product |
|---|---|
| 20 minutes | 78.85° C. |
| 1 hour | 79.18° C. |
| 5 hours | 79.55° C. |
| 18 hours | 79.70° C. |

The same naphthalene was then treated by the process of the present invention with two washes of 93% sulfuric acid, totaling 6%, the total reaction time being twenty minutes. The naphthalene was then treated with 2% by weight of 37% aqueous formaldehyde for twenty minutes and after neutralization and distillation as described in Example 1, the refined naphthalene had a setting point of 79.72° C. In other words, the para-formaldehyde sulfuric acid process required at least five hours to get a product which was sufficiently refined to be useful, and even then fell far short of the quality of the product obtained by the process of the present invention in two twenty-minute treatments. Only after eighteen hours was the finished product of comparable quality obtained.

We claim:

1. In a process of refining crude naphthalene by acid-washing and distillation the improvement which comprises forming an aqueous slurry of the crude naphthalene, said slurry containing for each 100 parts by weight of naphthalene from about 0.185 to about 1.85 parts by weight of formaldehyde, said formaldehyde being added as an aqueous solution thereof, and a total of from about one to about ten parts by weight of soluble organic acids selected from the group consisting of the alkane, benzene, naphthalene and thianaphthene sulfonic acids; at a temperature in the range of from about 80° to about 120° C. agitating said slurry for from one minute to one hour; collecting resultant treated solids and subjecting collected solids to said distillation.

2. A process according to claim 1 in which said treatment is carried out at a temperature in the range of from about 80° to about 100° C.

3. A process according to claim 1 in which at least a part of said total weight of soluble organic sulfonic acids is a naphthalene sulfonic acid.

4. A process according to claim 1 in which said soluble organic sulfonic acids comprise a mixture of naphthalene and thianaphthene sulfonic acids.

5. A process according to claim 1 in which, prior to addition of said aqueous formaldehyde solution, said crude naphthalene is sulfonated with concentrated sulfuric acid for only sufficient time to produce from at least one but not more than ten parts by weight of naphthalene sulfonic acids per 100 parts by weight of naphthalene.

6. A process according to claim 1 in which said organic sulfonic acids are added to said slurry in preformed state.

7. A process according to claim 6 in which said preformed organic sulfonic acids are added in solution as recycle liquor from a previous cycle.

References Cited in the file of this patent

UNITED STATES PATENTS

| | | |
|---|---|---|
| 1,819,680 | Hill | Aug. 18, 1931 |
| 1,996,262 | Todd et al. | Apr. 2, 1935 |

FOREIGN PATENTS

| | | |
|---|---|---|
| 760,054 | Great Britain | Oct. 31, 1956 |